Figure 1:
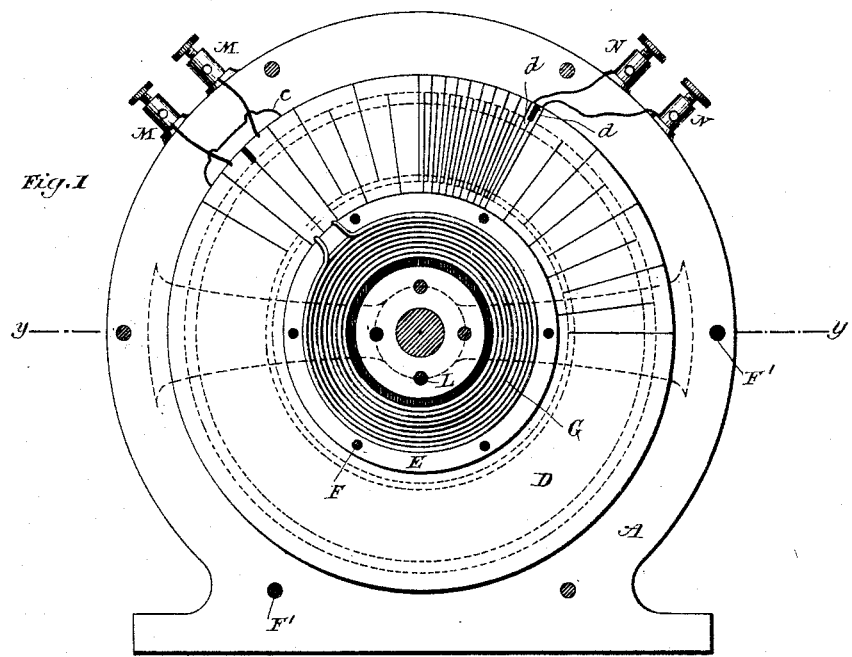

(No Model.) 2 Sheets—Sheet 1.

N. TESLA.
ALTERNATING ELECTRIC CURRENT GENERATOR.

No. 447,921. Patented Mar. 10, 1891.

Witnesses:
Ernest Hopkinson
Frank B. Murphy.

Inventor
Nikola Tesla
by
Duncan & Page
Attorneys.

(No Model.)  2 Sheets—Sheet 2.

N. TESLA.
ALTERNATING ELECTRIC CURRENT GENERATOR.

No. 447,921. Patented Mar. 10, 1891.

UNITED STATES PATENT OFFICE.

NIKOLA TESLA, OF NEW YORK, N. Y.

ALTERNATING-ELECTRIC-CURRENT GENERATOR.

SPECIFICATION forming part of Letters Patent No. 447,921, dated March 10, 1891.

Application filed November 15, 1890. Serial No. 371,554. (No model.)

*To all whom it may concern:*

Be it known that I, NIKOLA TESLA, a subject of the Emperor of Austria, from Smiljan, Lika, border country of Austria-Hungary, residing at New York, in the county and State of New York, have invented certain new and useful Improvements in Alternating-Current Machines, of which the following is a specification, reference being had to the accompanying drawings.

In the systems of distribution of electrical energy from alternating-current generators in present use the generators give ordinarily from one to three hundred alternations of current per second. I have recognized and demonstrated in practice that it is of great advantage, on many accounts, to employ in such systems generators capable of producing a very much greater number of alternations per second—say fifteen thousand per second or many more. To produce such a high rate of alternation, it is necessary to construct a machine with a great number of poles or polar projections; but such construction, on this account, in order to be efficient, is rendered difficult. If an armature without polar projections be used, it is not easy to obtain the necessary strength of field, mainly in consequence of the comparatively great leakage of the lines of force from pole to pole. If, on the contrary, an armature-core formed or provided with polar projections be employed, it is evident that a limit is soon reached at which the iron is not economically utilized, being incapable of following without considerable loss the rapid reversals of polarity. To obviate these and other difficulties, I have devised a form of machine embodying the following general features of construction.

I provide a field-magnet core made up of two independent parts formed with grooves for the reception of one or more energizing-coils. The energizing coil, or coils, is completely surrounded by the iron core, except on one side, where occurs the opening between the polar faces of the core, which opening is made as narrow as the conditions of the machine will permit. The polar faces of the core of the field are not smooth, but formed with a great many projections or serrations, the points of which in one side or polar face are preferably exactly opposite those in the other. Between the faces so formed I mount or support the armature coil or coils and provide either for rotating the field-magnet or the armature, or both, and I arrange the said armature-coil or conductor so that it will be symmetrically disposed with respect to the field—that is to say, so that when one portion of the conductor is passing through the strongest portion of the field the other portion, which forms the return for the former, is passing through the weakest points or parts of the field. The strongest points of the field, it will be understood, are those between the projections or points on the polar faces, while the weakest points lie midway between them.

A field-magnet, when constructed as above described, produces, when the energizing-coil is traversed by a continuous current, a field of great strength, and one which may be made to vary greatly in intensity at points not farther distant from one another than the eighth of an inch. In a machine thus constructed there is comparatively little of that effect which is known as "magnetic leakage," and there is also but a slight armature reaction. Either the armature-conductor or the field-magnet may be stationary while the other rotates, and as it is often desirable to maintain the conductors stationary and to rotate the field-magnet I have made a special modification of the construction of the machine for this purpose, and with a view in such case of still further simplifying the machine and rendering it more easy to maintain in operation I arrange the armature-conductors and the frame or supports therefor so as to support also a fixed coil or coils for energizing the rotating field-magnet, thus obviating the employment of all sliding contacts.

In the accompanying drawings I have illustrated the two typical forms of my machine above referred to.

Figure 2:
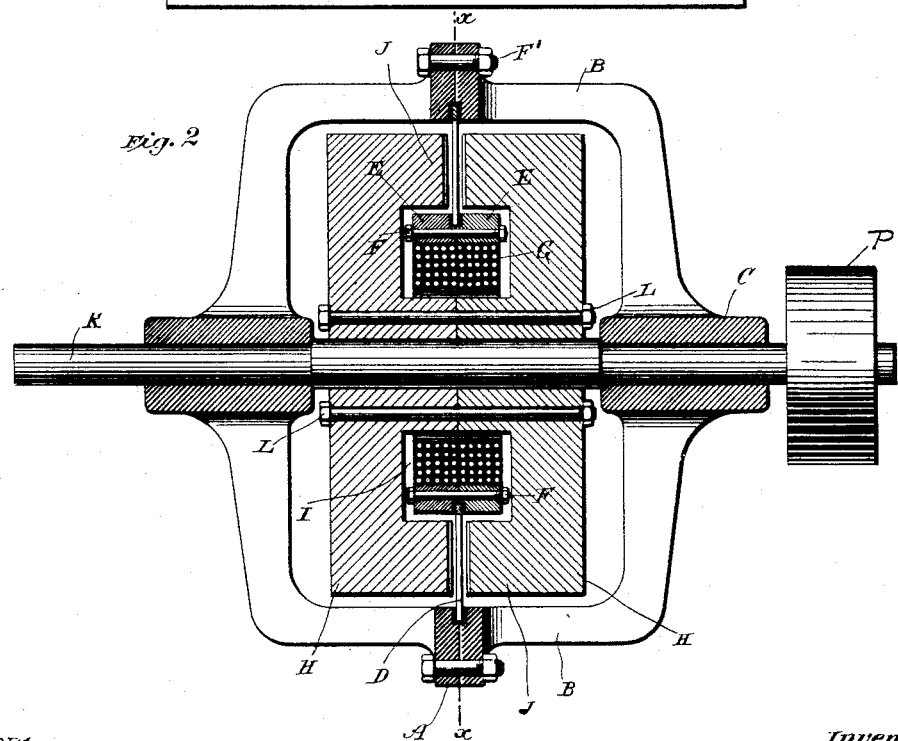
Figure 3:
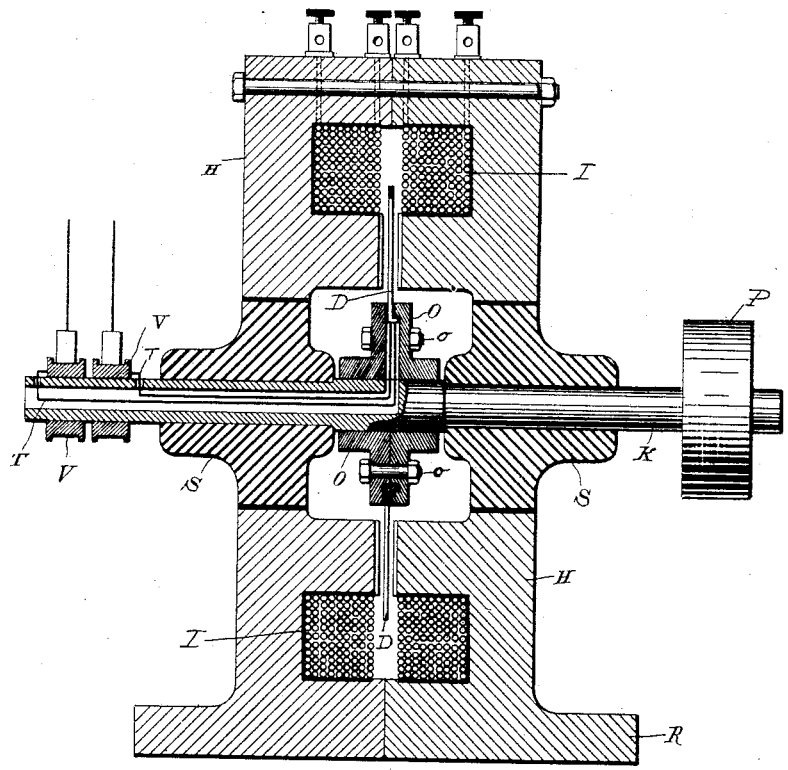
Figure 4:
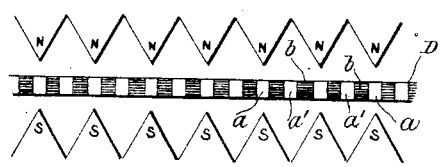

Figure 1 is a vertical central section of the machine, taken on lines $x$ $x$ of Fig. 2; and Fig. 2 is a horizontal section on line $y$ $y$ of Fig. 1. The machine in these two figures is one in which the armature-conductor and the field-coil are stationary while the field-magnet core revolves. Fig. 3 is a vertical central section of a machine embodying the same plan of construction, but having a stationary field-magnet and rotating armature. Fig. 4 is a diagram illustrating the peculiar configuration of the polar faces and the relation of the armature conductor or conductors thereto.

In Figs. 1 and 2, A A designate two cylindrical castings provided with bracket-arms B B, in which latter are bushings C for the rotating shaft. The conductor in which the currents are induced may be constructed or arranged in various ways; but I prefer to form it in the following manner: I take an annular plate of copper D and by means of a saw or other cutting-tool cut in it radial slots from one edge nearly through to the other, beginning alternately from opposite edges. In this way a continuous zigzag conductor is formed. To the inner edge of this plate are secured two rings of non-magnetic metal E, which are insulated from the copper conductor, but held firmly thereto, as by means of bolts F. Within the rings E is then placed an annular coil G, which is the energizing-coil for the field-magnet. The conductor D and the parts attached thereto are supported by means of the cylindrical shell or casting A A, the two parts of which are brought together and clamped by bolts F' to the outer edge of the conductor D. The conductor D is also insulated from the shell A.

The core for the field-magnet is built up of two circular parts H H, formed with annular grooves I, which, when the two parts are brought together, form a space for the reception of the energizing-coil G. The central parts or hubs of the cores H H are trued off, so as to fit closely against one another, while the outer portions or flanges which form the polar faces J J are reduced somewhat in thickness to make room for the conductor D, and are serrated on their faces or provided in any other convenient way with polar projections. The two parts of the core H H are mounted on and fixed to the shaft K, and are bound together by bolts L. The number of serrations in the polar faces is arbitrary; but there must exist between them and the radial portions of the conductor D a certain relation, which will be understood by reference to Fig. 4, in which N N represent the projections or points on one face of the core of the field, and S S the points of the other face. The conductor D is shown in this figure in section, $a\ a'$ designating the radial portions of the conductor, and $b$ the insulating-divisions between the same. The relative width of the parts $a\ a'$ and the space between any two adjacent points N N or S S is such that when the radial portions $a$ of the conductor are passing between the opposite points N S, where the field is strongest, the intermediate radial portions $a'$ are passing through the widest spaces midway between such points and where the field is weakest. Since the core on one side is of opposite polarity to the part facing it, all the points or projections of one polar face will be of opposite polarity to those of the other face. Hence, although the space between any two adjacent points on the same face may be extremely small, there will be no leakage of the magnetic lines between any two points of the same name; but the lines of force will pass across from one set of points to the other. The construction followed obviates to a great degree the distortion of the magnetic lines by the action of the current in the conductor D, in which it will be observed the current is flowing at any given time from the center toward the periphery in one set of radial parts $a$ and in the opposite direction in the adjacent parts $a'$.

In order to connect the energizing-coil G with a source of continuous current, I have found it convenient to utilize two adjacent radial portions of the conductor D for connecting the terminals of the coil G with two binding-posts M. For this purpose the plate D is cut entirely through, as shown, and the break thus made is bridged over by a short conductor $c$.

At any convenient point the plate D is cut through to form two terminals $d$, which are connected to binding-posts N.

The core H H, when rotated by the driving-pulley P, generates in the conductors D an alternating current, which is taken off from the binding-posts N. It will be observed that from the nature of the construction described this machine is capable of producing an alternating current of an enormously high rate of alternations.

When it is desired to rotate the conductor between the faces of a stationary field-magnet, I adopt the construction shown in Fig. 3. The conductor D in this case is or may be made in substantially the same manner as above described by slotting an annular conducting-plate and supporting it between two heads O, held together by bolts $o$ and fixed to the driving-shaft K. The inner edge of the plate or conductor D is preferably flanged to secure a firmer union between it and the heads O. It is insulated from said head. The field-magnet in this case consists of two annular parts H H, provided with annular grooves I for the reception of the coils. The flanges or faces surrounding the annular groove are brought together, while the inner flanges are serrated, as in the previous case, and form the polar faces. The two parts H H are formed with a base R, upon which the machine rests.

S S are non-magnetic bushings secured or set in the central opening of the cores.

The conductor D is cut entirely through at one point to form terminals, from which insulated conductors T are led through the shaft to collecting-rings V.

What I claim is—

1. The combination, in an annular field of force formed by opposing polar faces with radial grooves or serrations and with said poles, of a connected series of radial conductors so disposed with relation to the serrations that while one portion of the radial conductors is passing between the strongest parts of the field, or the points where the two poles most nearly approach, the adjacent or intermediate conductors will pass through the weakest parts of the field, or the points where the two poles are most remote, as set forth.

2. The combination, with a connected series of radial conductors forming an annular coil, of a stationary two-part supporting-frame clamped to and insulated from the outer ends of said conductors, a ring formed in two parts clamped to the inner ends of the same, an energizing-coil contained in said ring, and a field-core made in two parts and inclosing said energizing-coil and presenting annular polar faces to the series of radial conductors, as described.

3. The combination, with the annular conducting-plate slotted to form a connected series of radial conductors, a sectional supporting-frame secured to and insulated from the outer edge of the slotted plate, a sectional ring secured to and insulated from the inner edge of said plate, a hollow energizing-coil contained in said ring, and a field-core composed of two parts bolted together and recessed to inclose the energizing-coil, said cores being mounted in a rotating shaft, as set forth.

4. The combination, with two annular polar faces of opposite magnetic polarity and formed with opposite points, projections, or serrations, of a conductor turned back upon itself in substantially radial convolutions and mounted in the annular field, whereby a rotation of the field or said conductor will develop therein an alternating current, as set forth.

5. The combination, with a polar face of given polarity formed with grooves or serrations, of a polar face of opposite polarity with corresponding grooves or serrations, the two polar faces being placed with their grooves opposite to each other, and a conductor or coil mounted between said faces with the capability of movement across the lines of force in a direction at right angles to that of the grooves or serrations, as set forth.

6. In a magneto-electric machine, the combination of a sectional frame, a field-magnet core composed of two connected parts, a rotating shaft on which said core is mounted, a conductor in which currents are to be induced, the convolutions of which are radially disposed between the polar faces of the field-core and secured to and supported by the frame, and an energizing-coil for the field-core supported by the induced-current coil and contained in an annular recess formed by grooves in the faces of the two sections of the field-core.

7. The combination, with opposing field-magnet poles formed with projections or serrations in their faces, the highest parts or prominences of one face being opposite to those of the other, of a conductor the convolutions of which are adapted to pass at right angles through the magnetic lines between the opposing prominences, as set forth.

8. The combination, with a rotating field-magnet core having two opposing and annular polar faces with radial grooves or serrations therein systematically disposed, so that the highest parts or prominences of one face lie opposite to those of the other, of a stationary conductor with radial convolutions and mounted between the polar faces, as set forth.

NIKOLA TESLA.

Witnesses:
ROBT. F. GAYLORD,
PARKER N. PAGE.